United States Patent
Yu et al.

(10) Patent No.: US 8,717,704 B1
(45) Date of Patent: May 6, 2014

(54) DISK DRIVE DEFINING NON-CIRCULAR DATA TRACKS RELATIVE TO A ROTATION AXIS OF THE DISK

(75) Inventors: Jie Yu, Irvine, CA (US); Guoxiao Guo, Irvine, CA (US); Jianguo Zhou, Foothill Ranch, CA (US); Sanghoon Chu, San Jose, CA (US); Young-Hoon Kim, Cupertino, CA (US); Abhishek Dhanda, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 86 days.

(21) Appl. No.: 13/406,797

(22) Filed: Feb. 28, 2012

(51) Int. Cl.
*G11B 5/58* (2006.01)

(52) U.S. Cl.
USPC ........................................ 360/77.01

(58) Field of Classification Search
CPC ...... G11B 5/58; G11B 5/5586; G11B 5/5556; G11B 5/5539; G11B 5/5526
USPC .......... 360/77.01, 78.14, 77.02, 77.04, 77.08, 360/78.04, 78.09, 78.11; 369/44.27, 44.28, 369/44.34
See application file for complete search history.

(56) References Cited

U.S. PATENT DOCUMENTS

| | | | |
|---|---|---|---|
| 4,404,605 A * | 9/1983 | Sakamoto | 360/77.17 |
| 4,764,914 A | 8/1988 | Estes et al. | |
| 5,416,759 A * | 5/1995 | Chun | 369/44.36 |
| 5,612,833 A | 3/1997 | Yarmchuk et al. | |
| 5,668,679 A | 9/1997 | Swearingen et al. | |
| 5,793,559 A | 8/1998 | Shepherd et al. | |
| 5,844,742 A | 12/1998 | Yarmchuk et al. | |
| 5,889,631 A | 3/1999 | Hobson | |
| 5,907,447 A | 5/1999 | Yarmchuk et al. | |
| 5,930,068 A | 7/1999 | Gregg et al. | |
| 6,061,200 A | 5/2000 | Shepherd et al. | |
| 6,118,739 A | 9/2000 | Kishinami et al. | |
| 6,128,153 A | 10/2000 | Hasegawa et al. | |
| 6,141,175 A | 10/2000 | Nazarian et al. | |
| 6,181,652 B1 | 1/2001 | Katou et al. | |
| 6,370,094 B1 | 4/2002 | Kishinami et al. | |
| 6,392,834 B1 | 5/2002 | Ellis | |
| 6,421,198 B1 | 7/2002 | Lamberts et al. | |
| 6,442,112 B1 * | 8/2002 | Tateishi | 369/44.32 |
| 6,476,995 B1 | 11/2002 | Liu et al. | |
| 6,496,322 B1 | 12/2002 | Hasegawa et al. | |
| 6,510,112 B1 * | 1/2003 | Sakamoto et al. | 369/44.35 |
| 6,522,493 B1 | 2/2003 | Dobbek et al. | |
| 6,563,663 B1 | 5/2003 | Bi et al. | |
| 6,606,214 B1 | 8/2003 | Liu et al. | |
| 6,608,731 B2 | 8/2003 | Szita | |
| 6,611,397 B1 | 8/2003 | Nguyen | |
| 6,624,963 B2 | 9/2003 | Szita | |
| 6,654,198 B2 | 11/2003 | Liu et al. | |
| 6,657,810 B1 | 12/2003 | Kupferman | |
| 6,667,840 B1 | 12/2003 | Cheong et al. | |
| 6,735,040 B2 | 5/2004 | Galloway et al. | |

(Continued)

*Primary Examiner* — Nabil Hindi

(57) ABSTRACT

A disk drive is disclosed comprising a disk having a plurality of servo tracks defined by servo sectors, and a head actuated over the disk. The disk drive further comprises control circuitry comprising a servo control system operable to position the head over the disk. A disturbance is induced in the servo control system, and while positioning the head over the disk, a data track is accessed. The disturbance induced in the servo control system causes the data track to be non-circular relative to a rotation axis of the disk such that the non-circular data track crosses multiple of the servo tracks over a revolution of the disk.

18 Claims, 4 Drawing Sheets

(56) References Cited

U.S. PATENT DOCUMENTS

| | | | |
|---|---|---|---|
| 6,751,042 | B2 | 6/2004 | Bi et al. |
| 6,775,091 | B1 | 8/2004 | Sutardja |
| 6,785,084 | B2 | 8/2004 | Szita |
| 6,798,606 | B2 | 9/2004 | Tang et al. |
| 6,862,155 | B2 | 3/2005 | Yang et al. |
| 6,922,304 | B2 | 7/2005 | Nakagawa |
| 6,937,420 | B1 | 8/2005 | McNab et al. |
| 6,952,320 | B1 | 10/2005 | Pollock et al. |
| 6,965,491 | B1 | 11/2005 | Perlmutter et al. |
| 6,972,540 | B1 | 12/2005 | Wang et al. |
| 6,972,922 | B1 | 12/2005 | Subrahmanyam et al. |
| 6,975,478 | B2 | 12/2005 | Fukushima et al. |
| 6,977,792 | B1 | 12/2005 | Melrose et al. |
| 6,995,941 | B1 | 2/2006 | Miyamura et al. |
| 6,999,266 | B1 | 2/2006 | Schmidt |
| 7,002,767 | B2 | 2/2006 | Annampedu et al. |
| 7,012,778 | B2 | 3/2006 | Shigematsu |
| 7,027,255 | B2 | 4/2006 | Schmidt |
| 7,054,096 | B1 | 5/2006 | Sun et al. |
| 7,057,836 | B1 | 6/2006 | Kupferman |
| 7,068,451 | B1 | 6/2006 | Wang et al. |
| 7,106,542 | B1 | 9/2006 | Sun et al. |
| 7,106,547 | B1 | 9/2006 | Hargarten et al. |
| 7,110,209 | B2 | 9/2006 | Ehrlich et al. |
| 7,119,981 | B2 | 10/2006 | Hanson et al. |
| 7,123,433 | B1 | 10/2006 | Melrose et al. |
| 7,167,336 | B1 | 1/2007 | Ehrlich et al. |
| 7,230,786 | B1 | 6/2007 | Ray et al. |
| 7,257,062 | B2 | 8/2007 | Li et al. |
| 7,271,977 | B1 | 9/2007 | Melrose et al. |
| 7,286,317 | B1 | 10/2007 | Li et al. |
| 7,315,431 | B1 | 1/2008 | Perlmutter et al. |
| 7,317,669 | B2 | 1/2008 | Lee |
| 7,330,322 | B2 | 2/2008 | Hanson et al. |
| 7,333,280 | B1 | 2/2008 | Lifchits et al. |
| 7,333,287 | B2 | 2/2008 | Hara |
| 7,391,584 | B1 | 6/2008 | Sheh et al. |
| 7,408,735 | B1 | 8/2008 | Coric |
| 7,436,742 | B2 * | 10/2008 | Yanagawa .................. 369/47.53 |
| 7,457,075 | B2 | 11/2008 | Liu et al. |
| 7,460,328 | B2 | 12/2008 | Chase et al. |
| 7,474,491 | B2 | 1/2009 | Liikanen et al. |
| 7,477,473 | B2 | 1/2009 | Patapoutian et al. |
| 7,489,469 | B2 | 2/2009 | Sun et al. |
| 7,525,754 | B2 | 4/2009 | Melrose et al. |
| 7,551,387 | B2 | 6/2009 | Sun et al. |
| 7,561,361 | B1 | 7/2009 | Rutherford |
| 7,639,447 | B1 | 12/2009 | Yu et al. |
| 7,656,604 | B1 | 2/2010 | Liang et al. |
| 7,663,835 | B1 | 2/2010 | Yu et al. |
| 7,715,138 | B1 | 5/2010 | Kupferman |
| 7,760,455 | B2 | 7/2010 | Kang et al. |
| 7,796,479 | B2 * | 9/2010 | Kim et al. .................. 369/44.32 |
| 7,800,859 | B2 | 9/2010 | Moriya et al. |
| 7,839,591 | B1 | 11/2010 | Weerasooriya et al. |
| 7,876,523 | B1 | 1/2011 | Panyavoravaj et al. |
| 7,881,005 | B1 | 2/2011 | Cheung et al. |
| 7,924,519 | B2 | 4/2011 | Lambert |
| 8,059,360 | B1 | 11/2011 | Melkote et al. |
| 8,116,025 | B1 | 2/2012 | Chan et al. |
| 8,174,941 | B2 * | 5/2012 | Takazawa et al. ......... 369/44.32 |
| 2001/0040755 | A1 | 11/2001 | Szita |
| 2002/0067567 | A1 | 6/2002 | Szita |
| 2003/0218814 | A9 | 11/2003 | Min et al. |
| 2005/0152246 | A1 | 7/2005 | Li et al. |
| 2005/0185319 | A1 | 8/2005 | Liu et al. |
| 2005/0275964 | A1 | 12/2005 | Hara |
| 2007/0096678 | A1 | 5/2007 | Melrose |
| 2007/0097806 | A1 | 5/2007 | Beker et al. |
| 2007/0297088 | A1 | 12/2007 | Sun et al. |
| 2008/0186617 | A1 | 8/2008 | Hosono et al. |
| 2008/0239555 | A1 | 10/2008 | Ehrlich et al. |
| 2009/0002874 | A1 | 1/2009 | Melrose et al. |
| 2009/0052081 | A1 | 2/2009 | Chase et al. |
| 2009/0086364 | A1 | 4/2009 | Gerasimov |
| 2010/0020428 | A1 | 1/2010 | Mochizuki et al. |
| 2010/0195235 | A1 | 8/2010 | Vikramaditya et al. |
| 2010/0214686 | A1 | 8/2010 | Higa et al. |
| 2012/0033317 | A1 | 2/2012 | Szita |

* cited by examiner

DISK DRIVE DEFINING NON-CIRCULAR DATA TRACKS RELATIVE TO A ROTATION AXIS OF THE DISK

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 2 as comprising a number of servo tracks 6 defined by servo sectors $4_0$-$4_N$ recorded around the circumference of each servo track. Each servo sector 4, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 4, further comprises groups of servo bursts 14 (A,B,C,D in the example shown), which are recorded with precise intervals and offsets relative to the track centerlines. The servo bursts 14 provide fine head position information used for centerline tracking while accessing a data track during write/read operations.

The data tracks may be defined relative to the servo tracks so as to have the same or a different density than the servo tracks (e.g., a higher density than the servo tracks). In either case, at certain radial and/or circumferential locations the servo tracks may be written too close to one another (track squeeze) which decreases the reliability of the resulting data tracks due to adjacent track interference.

DETAILED DESCRIPTION

Figure 1:
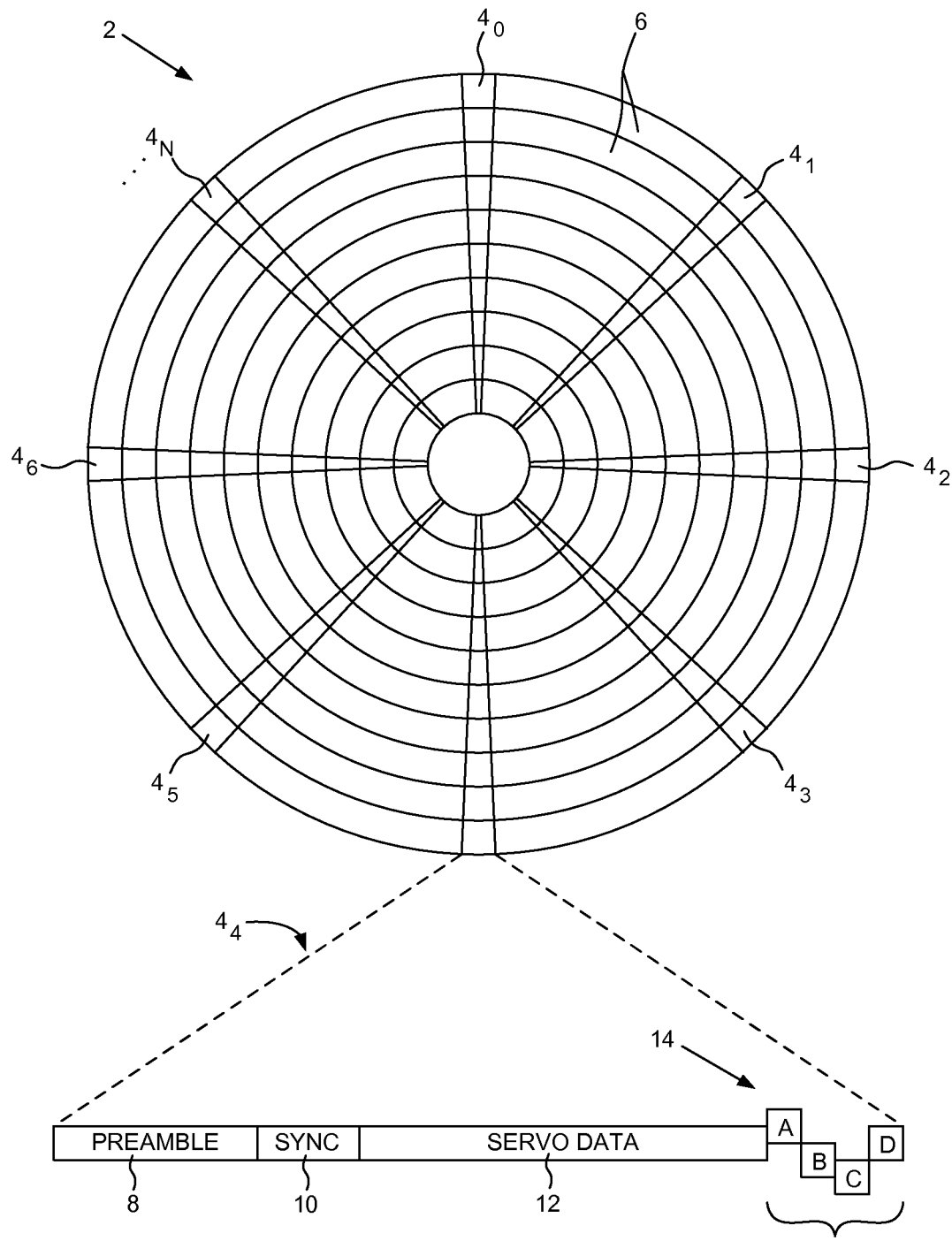
FIG. 1 shows a prior art disk format comprising servo tracks defined by servo sectors.
Figure 2A:
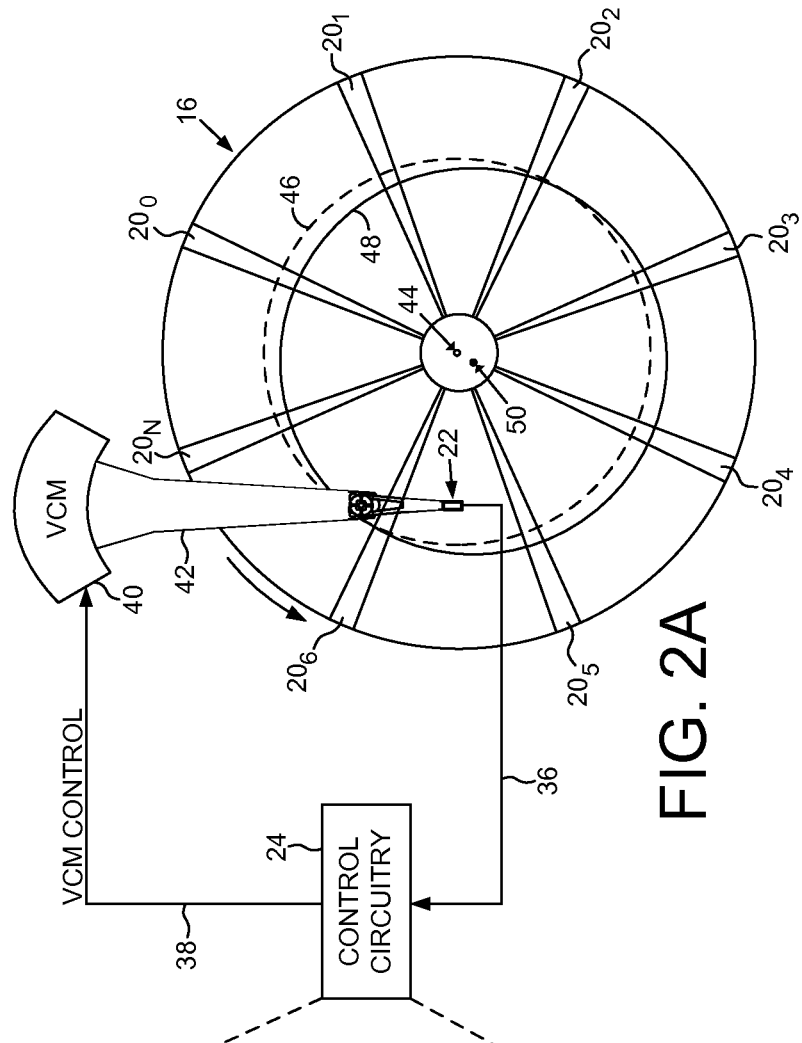
FIG. 2A shows a disk drive according to an embodiment of the present invention comprising a head actuated over a disk by a servo control system.
Figure 2B:
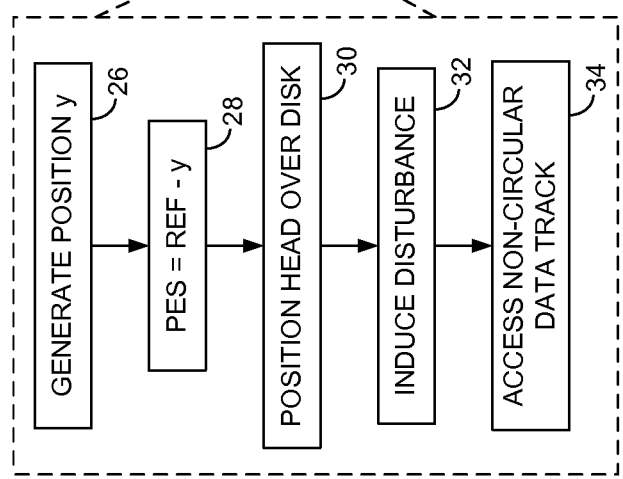
FIG. 2B is a flow diagram according to an embodiment of the present invention wherein a disturbance is induced in the servo control system in order to define non-circular data tracks.

FIG. 2A shows a disk drive according to an embodiment of the present invention comprising a disk 16 comprising a plurality of servo tracks defined by servo sectors $20_0$-$20_N$, and a head 22 actuated over the disk 16. The disk drive further comprises control circuitry 24 comprising a servo control system, wherein the control circuitry 24 is operable to execute the flow diagram of FIG. 2B. A position of the head over the disk is measured to generate a position signal (block 26). A position error signal (PES) representing a difference between the position signal and a reference signal is generated (block 28). The PES is processed with a servo compensator to generate a control signal for position the head over the disk (block 30). A disturbance is induced in the servo control system (block 32), and while positioning the head over the disk in response to the control signal, a data track is accessed (block 34), wherein the disturbance induced in the servo control system causes the data track to be non-circular relative to a rotation axis of the disk such that the non-circular data track crosses multiple of the servo tracks over a revolution of the disk. For the sake of brevity, throughout this disclosure, "non-circular" will be used to refer to this concept of being "non-circular relative to a rotation axis of the disk." The concept will be further illustrated with respect to FIGS. 2A, 3, 5 and 7.

In the embodiment of FIG. 2A, the control circuitry 24 processes a read signal 36 emanating from the head 22 in order to demodulate the servo sectors $20_0$-$20_N$ and generate the PES. The servo control system processes the PES to generate a control signal 38 applied to a voice coil motor (VCM) 40 which rotates an actuator arm 42 about a pivot in order to position the head 22 radially over the disk 16. Other embodiments may employ a different type of actuator, such as a linear actuator for actuating the head 22 radially over the disk 16.

In the embodiment of FIG. 2A, the rotation axis of the disk 16 is shown as the center 44 of the disk 16 such that a circular data track 46 (dashed line) would be defined about the center 44 of the disk 16. In contrast to such a circular data track 46 that is defined about the center 44 of the disk 16, a non-circular data track 48 may be defined in this embodiment by inducing a sinusoidal disturbance into the servo control system at the rotation frequency of the disk while writing to a data track. This causes the non-circular data track 48 to be defined about a center 50 that is offset from the center 44 of the disk 16. Although the embodiment of FIG. 2A shows the rotation axis of the disk 16 as the center 44 of the disk 16, in other embodiments the rotation axis of the disk 16 may be offset from the center 44 of the disk 16 due, for example, to a misalignment of the disk 16 when clamped to a spindle motor that rotates the disk 16.

Figure 3:
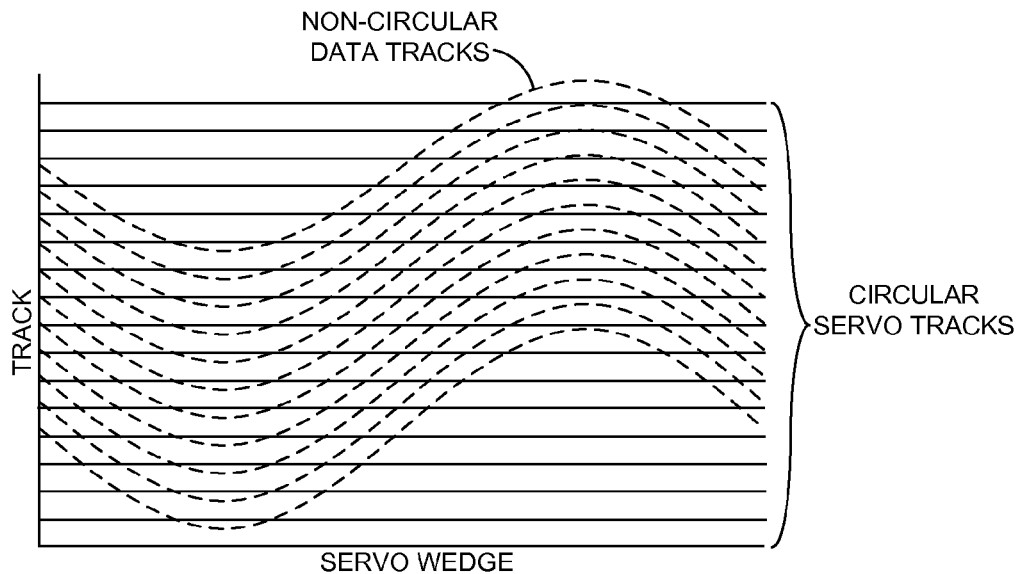
FIG. 3 shows an embodiment of the present invention wherein the servo tracks are circular and the data tracks are non-circular such that a data track cross multiple of the servo tracks over a revolution of the disk.

FIG. 3 illustrates an example of multiple non-circular data tracks (dashed lines) relative to each servo wedge over a single rotation of the disk 16. In this example, the disturbance induced in the servo control system is a sinusoidal disturbance at the rotation frequency of the disk such that the non-circular data tracks follow a sinusoidal path as illustrated in FIG. 3. Also in the example of FIG. 3 the servo tracks are shown as substantially circular (and therefore straight lines)

such that the data tracks will cross multiple of the servo tracks over a revolution of the disk. In one embodiment, the amplitude of the disturbance is selected so that a data track crosses at least three of the servo tracks over a revolution of the disk. Defining non-circular data tracks relative to the servo tracks may improve performance of the disk drive servo control system, for example, by compensating for track squeeze that may manifest in the servo tracks. It may also improve performance during certain calibration operations, such as when calibrating the fly height of the head by averaging out errors over multiple servo tracks. Accordingly, the term "non-circular data track" as used herein is intended to cover a user data track for storing user data as well as any other suitable data track, such as a calibration data track for performing any suitable calibration operation.

Figure 4A:
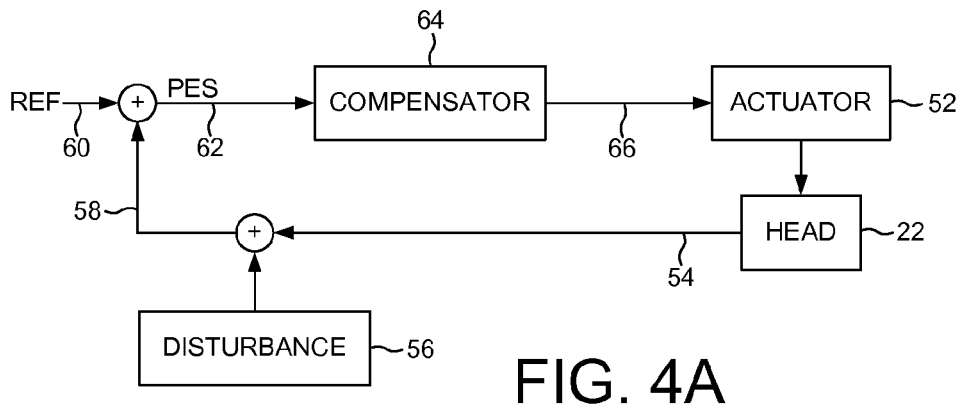
FIG. 4A shows a servo control system according to an embodiment of the present invention wherein the disturbance is induced into a position error signal (PES) by adding the disturbance to a measured position of the head.

The disturbance may be induced at any suitable point in the servo control system. FIG. 4A shows an example servo control system for accessing a non-circular data track. An actuator 52 (e.g., a VCM) actuates the head 22 over the disk 16, and a position 54 of the head 22 is measured by demodulating the servo sectors $20_0$-$20_N$. A disturbance 56 is added to the measured head position 54, and the modified position 58 is subtracted from a reference position 60 to generate a modified PES 62. A suitable compensator 64 processes the modified PES 62 to generate a control signal 66 applied to the actuator 52. In another embodiment, the disturbance 56 may be added to the PES to generate the modified PES 62.

Figure 4B:
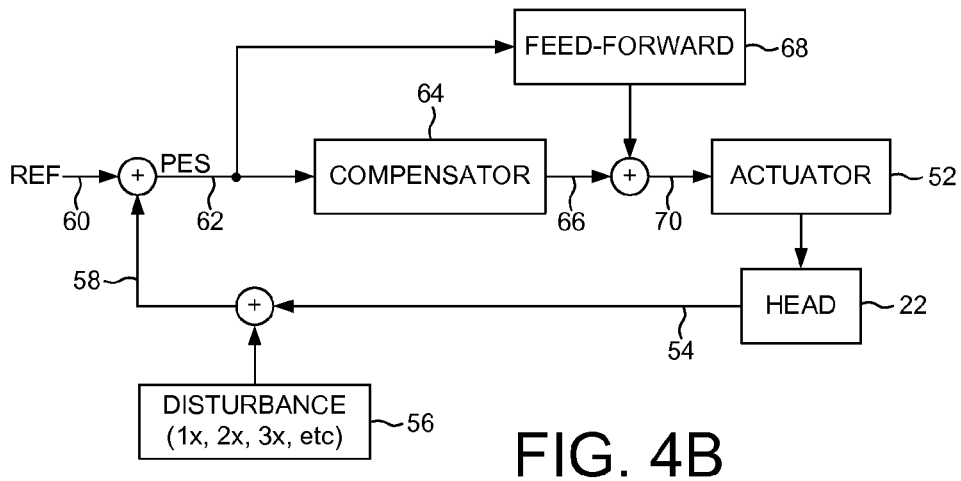
FIG. 4B shows an embodiment of the present invention wherein the servo control system comprises feed-forward compensation to force the head to follow the disturbance in the PES while writing data to the non-circular data track.

FIG. 4B shows another embodiment wherein the servo control system comprises feed-forward compensation 68 generated in response to the modified PES 62. For example, the feed-forward compensation 68 may adapt coefficients of one or more sinusoids to match the disturbance in the modified PES 62. The feed-forward compensation 68 is added to the control signal 66 to generate a modified control signal 70 applied to the actuator 52. The feed-forward compensation 68 forces the head 22 to follow the disturbance in the PES while accessing the non-circular data track.

Figure 5:
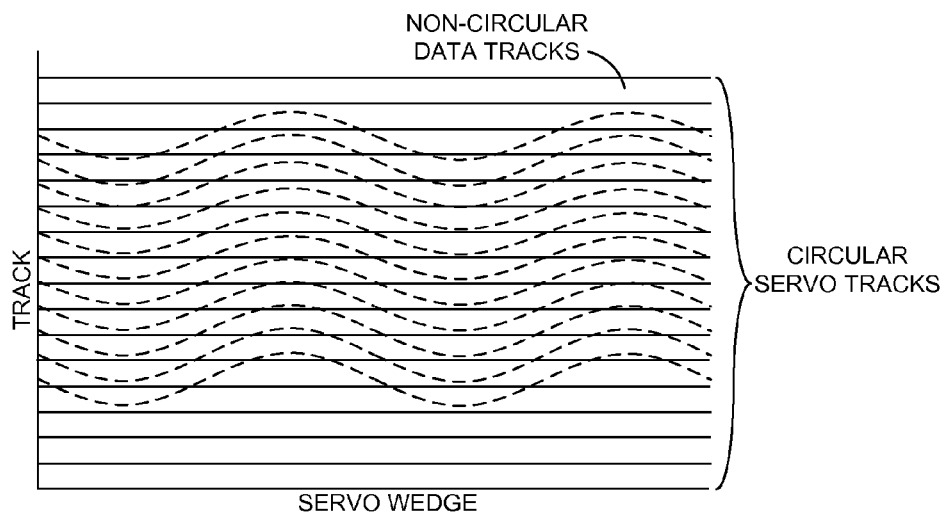
FIG. 5 shows an embodiment of the present invention wherein the disturbance comprises a sinusoid having a frequency equal to twice the rotation frequency of the disk such that a data track follows a corresponding sinusoidal path.

FIG. 4B also illustrates an embodiment of the present invention wherein the disturbance 56 may comprise a multiple (1×, 2×, 3×, etc.) of a rotation frequency of the disk 16. For example, if the disturbance comprises 1× the disk rotation frequency, the non-circular data tracks will be circular in form but non-centric relative to the rotation axis of the disk (as shown in FIG. 2A and hence non-circular relative to the rotation axis of the disk). If the disturbance comprises 2× the disk rotation frequency, the non-circular servo tracks will follow a sinusoidal path around the circumference of the disk 16 relative to the rotation axis of the disk 16 as illustrated in FIG. 5. In one embodiment, the disturbance may comprise a combination of rotation frequencies (e.g., 1× plus 2× plus 3×). In other embodiments, the disturbance may comprise any suitable deterministic signal including a non-periodic deterministic signal.

Figure 6:
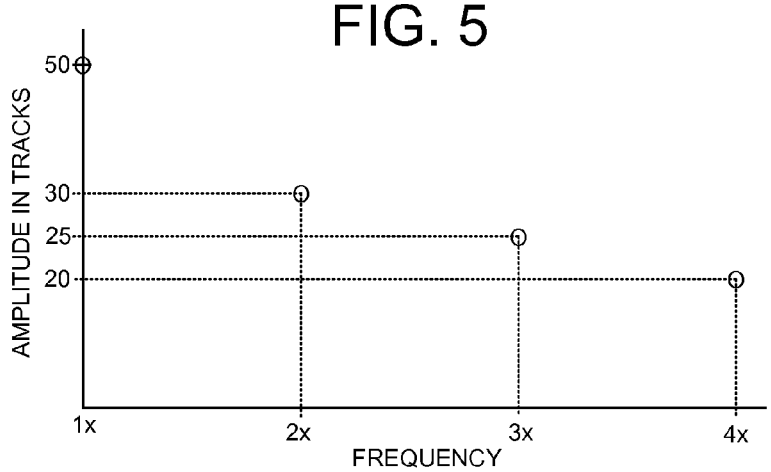
FIG. 6 shows an embodiment of the present invention wherein the disturbance may have an amplitude that is inversely proportional to its frequency.

In one embodiment, the amplitude and/or frequency of the disturbance may be selected to achieve a desired performance when accessing the non-circular data tracks. For example, the effect of track squeeze of the servo tracks may be mitigated by selecting a disturbance having a lower frequency with higher amplitude, or higher frequency with lower amplitude. An example of this embodiment is shown in FIG. 6 where the amplitude of the disturbance (in servo tracks crossed) decreases as the frequency (in multiples of disk rotation frequency) increases. In one embodiment, the amplitude/frequency of the disturbance may be selected so as to optimize performance of the servo control system, for example, by avoiding amplitudes/frequencies that may excite resonances of the servo control system. The optimal amplitude/frequency of the disturbance may be determined theoretically based on nominal attributes of the servo control system, or it may be determined empirically by evaluating each production disk drive or by evaluating a subset of disk drives to determine a nominal amplitude/frequency applied to each production disk drive.

Figure 7:
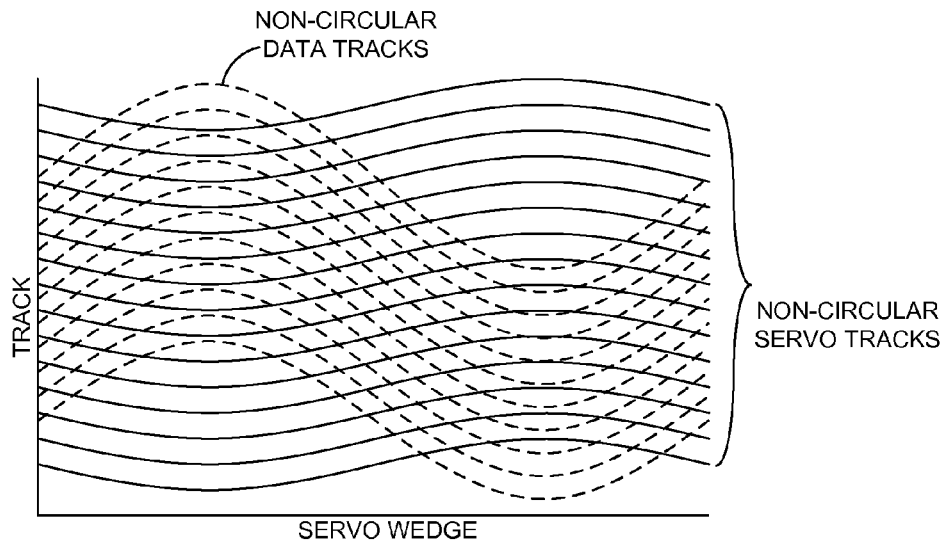
FIG. 7 shows an embodiment of the present invention wherein the servo tracks may be non-circular and the disturbance configured to have a phase opposite a phase of the non-circular servo tracks.

In one embodiment, the servo tracks may be non-circular relative to a rotation axis of the disk. Non-circular servo tracks may be due to a misalignment when a pre-servo written disk is clamped to a spindle motor for rotating the disk, or it may be due to errors while self-writing the servo sectors to the disk (written-in errors). The non-circular servo tracks will result in a repeatable runout (RRO) in the PES (before applying the disturbance) that typically comprises the fundamental disk rotation frequency (1×) and may also comprise harmonics (2×, 3×, etc.). FIG. 7 shows an example of this embodiment where the non-circular servo tracks are shown as having a sinusoidal path at the 1× disk rotation frequency.

In one embodiment, the phase of the disturbance induced in the servo control system in order to write the non-circular data tracks is selected relative to the RRO in the non-circular servo tracks. In the example of FIG. 7, the phase of the disturbance is configured to be opposite the phase of the RRO in the non-circular servo tracks. This embodiment increases the effective amplitude of the disturbance since each data track crosses more of the servo-tracks. That is, the amplitude of the RRO in the servo tracks is effectively added to the amplitude of the disturbance without needing to increase the actual amplitude of the disturbance. This embodiment may help reduce power consumption of the servo control system since the deviation of the head from a circular path decreases as the actual amplitude of the disturbance decreases.

The RRO in the non-circular servo tracks may be determined in any suitable manner. In one embodiment, the disturbance 56 induced in the servo control system of FIG. 4B may be disabled while adapting coefficients of one or more sinusoids used to generate the feed-forward compensation 68. The coefficients of the sinusoids are adapted in a direction that reduces the RRO error in the PES 62, and when the RRO in the PES decreases to a sufficiently small amount, the sinusoids used to generate the feed-forward compensation 68 represent the RRO in the non-circular servo tracks. The phase of the disturbance 56 may then be selected relative to the phase of the sinusoids.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo tracks defined by servo sectors;
   a head actuated over the disk; and
   control circuitry comprising a servo control system operable to:
   measure a position of a head over the disk to generate a position signal;
   generate a position error signal (PES) representing a difference between the position signal and a reference signal;
   process the PES with a servo compensator to generate a control signal; and
   position the head over the disk in response to the control signal;
   wherein the control circuitry is further operable to:
   induce a disturbance in the servo control system; and
   while positioning the head over the disk in response to the control signal, access a data track, wherein the disturbance induced in the servo control system causes the data track to be non-circular relative to a rotation axis of the disk such that a center of the non-circular data track crosses multiple of the servo tracks over a revolution of the disk.

2. The disk drive as recited in claim 1, wherein the center of the non-circular data track crosses at least three of the servo tracks over the revolution of the disk.

3. The disk drive as recited in claim 1, wherein the servo control system is further operable to:
   induce the disturbance in the PES to generate a modified PES;
   generate a feed-forward signal in response to the modified PES; and
   adjust the control signal in response to the feed-forward signal, wherein the head is positioned over the disk using the adjusted control signal.

4. The disk drive as recited in claim 1, wherein the disturbance comprises a sinusoid.

5. The disk drive as recited in claim 4, wherein a frequency of the sinusoid comprises a rotation frequency of the disk.

6. The disk drive as recited in claim 4, wherein a frequency of the sinusoid comprises a multiple of a rotation frequency of the disk.

7. The disk drive as recited in claim 1, wherein the servo tracks are substantially circular relative to the rotation axis of the disk.

8. The disk drive as recited in claim 1, wherein the servo tracks are substantially non-circular relative to the rotation axis of the disk.

9. The disk drive as recited in claim 8, wherein the disturbance comprises a phase substantially opposite a phase of the non-circular servo tracks.

10. A method of operating a disk drive, the disk drive comprising a disk comprising a plurality of servo tracks defined by servo sectors, and a head actuated over the disk, the method comprising:
    measuring a position of a head over the disk to generate a position signal;
    generating a position error signal (PES) representing a difference between the position signal and a reference signal;
    processing the PES with a servo compensator to generate a control signal; and
    positioning the head over the disk in response to the control signal;
    induce a disturbance in the PES to generate a modified PES; and
    while positioning the head over the disk in response to the control signal, access a data track, wherein the disturbance induced in the PES causes the data track to be non-circular relative to a rotation axis of the disk such that a center of the non-circular data track crosses multiple of the servo tracks over a revolution of the disk.

11. The method as recited in claim 10, wherein the center of the non-circular data track crosses at least three of the servo tracks over a revolution of the disk.

12. The method as recited in claim 10, further comprising:
    generating a feed-forward signal in response to the modified PES; and
    adjusting the control signal in response to the feed-forward signal, wherein the head is positioned over the disk using the adjusted control signal.

13. The method as recited in claim 10, wherein the disturbance comprises a sinusoid.

14. The method as recited in claim 13, wherein a frequency of the sinusoid comprises a rotation frequency of the disk.

15. The method as recited in claim 13, wherein a frequency of the sinusoid comprises a multiple of a rotation frequency of the disk.

16. The method as recited in claim 10, wherein the servo tracks are substantially circular relative to the rotation axis of the disk.

17. The method as recited in claim 10, wherein the servo tracks are substantially non-circular relative to the rotation axis of the disk.

18. The method as recited in claim 17, wherein the disturbance comprises a phase substantially opposite a phase of the non-circular servo tracks.

\* \* \* \* \*